United States Patent [19]

Dellinger

[11] Patent Number: 4,942,673
[45] Date of Patent: Jul. 24, 1990

[54] SINTERING PREVENTION IN STAGNANT ZONES OF FLUID BED BOILERS

[75] Inventor: Rick L. Dellinger, Canal Fulton, Ohio

[73] Assignee: The Babcock & Wilcox Company, New Orleans, La.

[21] Appl. No.: 233,391

[22] Filed: Aug. 18, 1988

[51] Int. Cl.$^5$ ............................................. F26B 3/08
[52] U.S. Cl. ...................................... 34/10; 34/57 A; 110/254
[58] Field of Search ............. 366/101; 34/57 A, 57 R, 34/10; 110/245; 432/58, 15

[56]  References Cited
U.S. PATENT DOCUMENTS 4,685,809  8/1987  Huttlin ................................. 34/57 A Primary Examiner—Henry A. Bennett
Attorney, Agent, or Firm—Robert J. Edwards; Michael L. Hoelter

[57] ABSTRACT

A particle storage chamber in a circulating fluid bed boiler having fluidizing means therein to tumble and fluidize the collected ash and ash coated particles. Due to the fuel burned, these ash and ash coated particles contain sodium and potassium compounds which react to lower the eutectic point of the particles thereby causing them to agglomerate or sinter. By fluidizing these particles, they are prevented from reacting through surface contact. Consequently, the ash and ash coated particles do not agglomerate or sinter thereby maintaining the individual characteristics of these particles and allowing smooth flowability for recirculation to the primary furnace zone.

16 Claims, 1 Drawing Sheet

SINTERING PREVENTION IN STAGNANT ZONES OF FLUID BED BOILERS

FIELD OF THE INVENTION

This invention pertains to circulating fluid bed boilers in general and more particularly to the reduction of the ash/media agglomeration or sintering that occurs in a storage chamber or other area of spasmodic flow/stagnation following the primary particle collector of such boilers.

BACKGROUND OF THE INVENTION

In circulating fluid bed boilers, fuel combustion is typically carried out in the presence of a bubbling bed of silica sand, feldspathic sand and/or calcined limestone. Air is forced through this bed of fuel and sand, and/or limestone to fluidize it, and, as the air velocity leaving the primary furnace zone increases, the fuel ash from combustion and other small particles become entrained in this upward flow of the flue gas. The hot ash and other material carried by the flue gas are then removed in a primary collector and are collected in a storage chamber such as a particle storage hopper or other area of spasmodic flow/stagnation, before being recirculated back to the fluid bed.

These particles move through the storage chamber or other receptacle at varying, low flow transport rates while either at a high temperature or subject to high temperatures. This combination of low flow rate and high temperature causes the particles, which are coated with fuel ash, to contact each other and form weak physical bonds or to agglomerate. The formation of these weak bonds or agglomeration is due to the surface of the particles having a low eutectic point or ash softening temperature. This low value is caused by the high alkali content, specifically sodium and potassium compounds, formed during combustion of the boiler fuel. The agglomerated particles, subjected to high temperatures, then begin to sinter or stick together through bond densification thereby forming a strong physical/chemical bond. Such agglomeration or sintering not only occurs between particles thereby creating large clumps of mass, but those particles also stick to the walls of the storage chamber or other receptacle wherever the particles are subjected to spasmodic flow or are stagnant. Consequently, as one can well imagine, this characteristic severely affects the ability to recirculate these particles which oftentimes leads to forced boiler outages.

To counteract this problem, such solutions as lowering the level in the storage chamber, adding limestone in a sand bed media unit to raise the softening point on the particle surface and changing the chemical makeup of the fuel and/or sand/limestone have helped to a degree, but sintering is still a problem. Other solutions such as using sootblowers or sparge pipes have been attempted but once the particles agglomerate (form a weak bond) or sinter (form a strong bond), these solutions did nothing more than simply blow holes in the now-solid material, they did not prevent the situation from occuring in the first place.

It is thus an object of this invention to prevent the agglomeration or sintering of ash-coated particles and particularly when these particles are collected and stored (albeit temporarily) in a storage chamber of a circulating fluid bed boiler or other receptacle where the particles are subjected to spasmodic flow or are stagnant. It is a further object of this invention to prevent such agglomerating or sintering before it occurs rather than to treat the particles after they have already consolidated.

SUMMARY OF THE INVENTION

This invention pertains to a storage chamber of a circulating fluid bed boiler, such as a particle storage hopper, having at least one lower discharge opening and an open upper area configured to receive ash and ash coated particles, some or all of these particles containing sodium or potassium compounds. Secured within the storage chamber or, in the disclosed embodiment, the particle storage hopper is at least one fluidizing header positioned adjacent to but not directly above the lower discharge opening. This fluidizing header extends along the entire length of the disclosed particle storage hopper. A series of injection nozzles are secured to an upper region of each fluidizing header and these nozzles are roughly positioned at a mid region between the discharge opening and the upper level of the collected and stored particles. Heated fluidizing medium, such as recycled flue gas and/or auxiliary air, discharged through the injection nozzles to separate and fluidize the collected particles. By tumbling the materials in the storage chamber, the ash coated particles are prevented from agglomerating and sintering, which is the result of the sodium and potassium compounds reacting to lower the particle surface eutectic point (softening temperature). The lower the particle surface eutectic pont, the greater the tendency for the particles to stick together.

The method of preventing the agglomeration of the collected ash or ash coated particles, these particles being collected in a storage chamber or other receptacle subject to spasmodic flow or stagnation, includes the step of venting a heated fluidizing medium into the chamber at a location adjacent to but not directly above the lower discharge opening in the chamber. Such venting causes these particles to tumble or become fluidized. By maintaining the separation of the ash-coated particles in the pressence of the sodium and potassium compounds, the eutectic point of the ash and ash-coated particles, although lowered, is rendered ineffective through minimized physical contact of the particles thereby preventing their agglomeration or sintering.

DETAILED DESCRIPTION OF THE DRAWINGS

Figure 1:
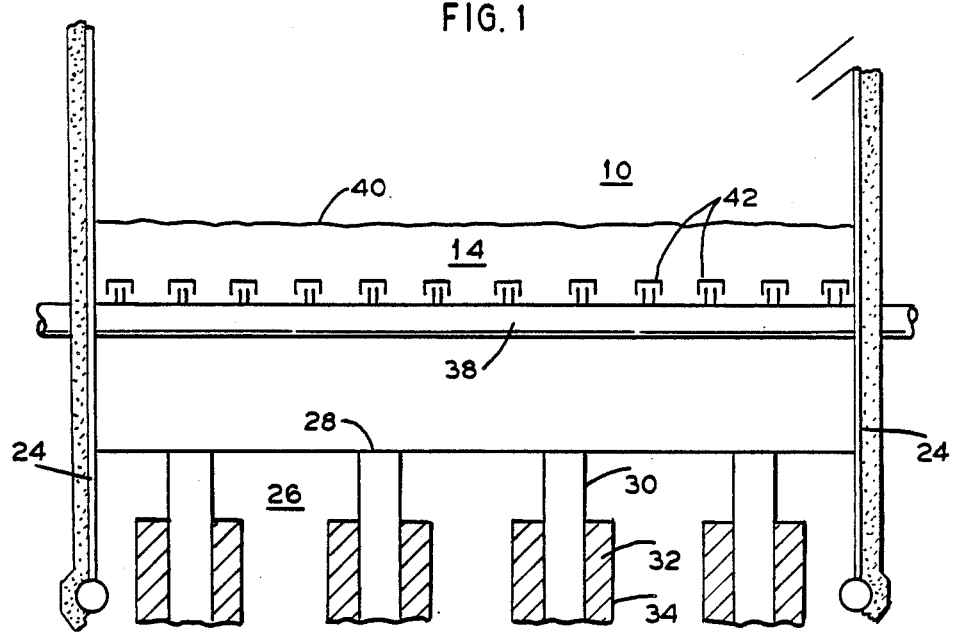
FIG. 1 is a side view of a storage chamber or, more specifically, a particle storage hopper illustrating the invention.
Figure 2:
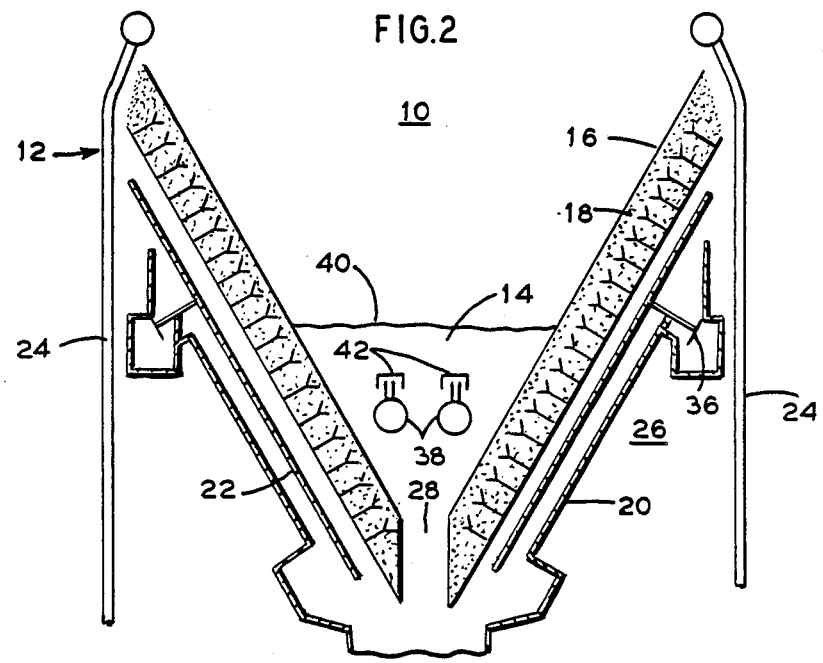
FIG. 2 is a front view of a storage chamber or, more specifically, a particle storage hopper illustrating the invention.

Referring to FIGS. 1 and 2, there is shown front and side views of a storage chamber such as particle storage hopper 10 which forms a part of circulating fluid bed boiler 12. In this embodiment, the storage chamber as represented by particle storage hopper 10 is positioned downstream of the fluid bed furnace (not shown) and generally underneath a separator (not shown) such as a non-mechanical particle separator whether it be a labrynith or non-labrynith type.

Flue gas, ash, and hot air-born particles leaving the fluid bed furnace pass through the separator where the ash and other particles 14 are separated out. The remaining flue gas is subsequently vented to the atmosphere while particles 14 become collected in particle storage hopper 10. These hot particles 14 remain in particle storage hopper 10 until they are recirculated back to the fluid bed furnace for further use such as lower furnace level and lower furnace temperature control. The rate of flow through hopper 10 is, at best, spasmodic with particles 14 oftentimes being stagnant.

In this embodiment, particle storage hopper 10 has sloping sidewalls 16 that are lined with high temperature refractory 18. This refractory 18 helps protect the sides of particle storage hopper 10 as well as maintain the high temperature of particles 14. The exterior surface of sidewalls 16 may also be insulated 20 to maintain the high temperature within particle storage hopper 10. A series of tubes 22 extend along particle storage hopper 10 to absorb such heat while other tubes 24 surround particle storage hopper vestibule 26. Some of tubes 24 may be furnace rear wall tubes while others may be convection pass frontwall tubes.

Particle storage hopper 10 is shown configured as a 'V'-shaped trough although hopper 10 may be any configuration such as 'U' or circular shaped or rectangular-shaped with side walls 16 perpendicular to its bottom surface. No matter what the shape, each hopper 10 has at least one lower discharge opening 28 (but preferably more than one) connecting to a standpipe 30. As illustrated in the figures, it is through standpipe 30 that particles 14 travel when being recirculated back to the fluid bed furnace. Each standpipe 30 (there may be more than one) is insulated 32 and enclosed within casing 34, such as a carbon steel casing, to protect it. Generally, standpipe 30 forms a part of a non-mechanical, such an 'L' or 'J' valve, standpipe assembly (as these terms are used in the trade) or a part of a loop or other standpipe assembly. Such standpipe assemblies are useful in controlling the recirculation of particles 14 to the fluid bed furnace.

As illustrated, the upper region of 'V'-shaped particle storage hopper 10 is, of course, open or unobstructed so as to receive and collect particles 14 coming from the separator. Structural support members 36 are secured to sidewalls 16 to anchor and support particle storage hopper 10 within circulating fluid bed boiler 12.

Fluidizing headers 38 are positioned within particle storage hopper 10 adjacent to but not directly above discharge openings 28. As shown in this embodiment, headers 38 are located approximately mid-way between discharge openings 28 and the upper surface 40 of particles 14. Headers 38 are secured to and extend along particle storage hopper 10. A series of injector nozzles or bubble caps 42 are spaced along the upper surface of each fluidizing header 38. These nozzles 42 provide a passageway for the injection of a fluidizing medium into particle storage hopper 10. This medium may be recirculated flue gas or it may be heated low pressure air.

As heated particles 14 collect in particle storage hopper 10, their coating of fuel ash, and its corresponding low softening temperature, causes them to agglomerate and/or sinter. This low softening temperature is due primarily to the high alkali content (sodium and potassium) of the boiler fuel. These sodium and potassium compounds react to lower the eutectic point (softening temperature) at the particle surface thereby enabling particles 14 to interract and agglomerate or sinter together. This phenomena especially occurs when particles 14 are stagnant or are subjected to and low flow rates through particle storage hopper 10 while at a high temperature.

To prevent such sintering from occurring (rather than treating it after the fact), a fluidizing medium is vented through injection nozzles 42 of fluidizing headers 38. This venting is done with sufficient force and volumn so as to tumble or percolate hot particles 14 thereby minimizing their surface contact time. The degree to which this venting occurs depends upon the characteristics of particles 14 and their eutectic point. For true fluidization, the venting must occur at a rate that exceeds the minimum fluidizing velocity of particles 14. Under these conditions, particles 14 would have a horizontal upper surface 40. By introducing the fluidizing medium at a rate less than that required for true fluidization, particles 14 would more correctly be said to be aerated and they would lose their resistance to flow gradually. In either case, the term 'fluidize' is intended to refer to the venting of a fluidizing medium at a rate either below or above the minimum fluidizing velocity of particles 14. Such fluidizing has the effect of not only preventing particles 14 from collecting together but it also prevents them from sticking to sidewalls 16 of particle storage hopper 10. When flue gas is used as the fluidizing medium, the temperature of particles 14 in particle storage hopper 10 remains relatively constant.

A benefit of fluidizing particles 14 within particle storage hopper 10, besides the avoidance of sintering, is the increased flowability through standpipes 30 and especially during times of low or no flow rates to the boiler. Such upward percolation through particles 14 provides for the continuous delivery of particles 14 to circulating fluid bed boiler 12. It also aids in the accurate level detection of particles 14 in particle storage hopper 10 by eleminating uneven levels or voids in the hopper and it provides for a semiconstant head of material over discharge openings 28 and hence standpipes 30.

What is claimed is:

1. An anti-agglomeration apparatus comprising:
   (a) a storage chamber having at least one lower discharge opening and a generally open upper region, said storage chamber temporarily storing high temperature ash and ash-coated particles therein, some of said particles containing potassium and/or sodium compounds;
   (b) fluidizing means comprising at least one header secured to said chamber for fluidizing said stored particles, said header extending along the length of said chamber and positioned adjacent to but not directly above said lower discharge opening;
   (c) a series of spaced injection nozzles secured to an upper region of said header and positioned at a mid-region between said discharge opening and the upper level of said ash and ash coated particles; and,
   (d) a heated fluidizing medium flowing through said injection nozzles and into said storage chamber, said fluidizing medium flowing generally upwardly toward said upper open region.

2. An anti-agglomeration apparatus as set forth in claim 1 wherein said open upper region is positioned undereath a non-mechanical particle separator whether it be of the labyrinth or non-labyrinth type.

3. An anti-agglomeration apparatus as set forth in claim 2 wherein said fluidizing medium is recirculated flue gas.

4. An anti-agglomeration apparatus as set forth in claim 2 wherein said fluidizing medium is low pressure air.

5. An anti-agglomeration apparatus as set forth in claim 2 wherein said lower discharge opening is connected to an L-valve standpipe system.

6. An anti-agglomeration apparatus as set forth in claim 2 wherein said lower discharge opening is connected to a J-valve standpipe system.

7. An anti-agglomeration apparatus as set forth in claim 2 wherein said lower discharge opening is connected to a loop valve standpipe system.

8. An anti-agglomeration method for preventing the sintering of ash-coated particles comprising the steps of:
  (a) collecting ash and ash-coated particles in a storage chamber having at least one lower discharge opening therein, some of said particles containing potassium and/or sodium compounds;
  (b) venting a heated fluidizing medium into said storage chamber adjacent to but not directly above said discharge opening;
  (c) fluidizing said ash and ash-coated particles collected within said storage chamber by means of said fluidizing medium; and
  (d) maintaining the separation of said particles containing potassium and/or sodium compounds, which lower the surface eutectic point of said particles, to prevent particle-to-particle interaction and thereby preventing their agglomeration.

9. The method as set forth in claim 8 wherein said fluidizing medium is vented by means of a fluidizing header within said storage chamber, said header extending along the entire length of said storage chamber.

10. The method as set forth in claim 9 wherein said fluidizing header comprises a series of spaced injection nozzles secured to an upper region of said fluidizing header and positioned at a mid-region between said discharge opening and the upper level of said ash and ash-coated particles.

11. The method as set forth in claim 10 wherein said storage chamber, and especially said upper open region, is positioned underneaath a non-mechanical particle separator whether it be of the labyrinth or non-labyrinth type.

12. The method as set forth in claim 11 wherein said fluidizing medium is recirculated flue gas.

13. The method as set forth in claim 11 wherein said fluidizing medium is low pressure air.

14. The method as set forth in claim 11 wherein said lower discharge opening is connected to an L-valve standpipe system.

15. The method as set forth in claim 11 wherein said lower discharge opening is connected to a J-valve standpipe system.

16. The method as set forth in claim 11 wherein said lower discharge opening is connected to a loop valve standpipe system.

* * * * *